US012807753B2

(12) United States Patent
Kanda et al.

(10) Patent No.: US 12,807,753 B2
(45) Date of Patent: Nov. 24, 2026

(54) POLYACETAL COPOLYMER AND METHOD OF MANUFACTURING THE SAME

(71) Applicant: POLYPLASTICS CO., LTD., Tokyo (JP)

(72) Inventors: Yuuki Kanda, Fuji (JP); Tomohiro Monma, Fuji (JP); Eiji Masuda, Fuji (JP)

(73) Assignee: DAICEL CORPORATION, Osaka (JP)

( * ) Notice: Subject to any disclaimer, the term of this patent is extended or adjusted under 35 U.S.C. 154(b) by 707 days.

(21) Appl. No.: 18/246,740

(22) PCT Filed: Aug. 23, 2021

(86) PCT No.: PCT/JP2021/030764

§ 371 (c)(1),
(2) Date: Mar. 27, 2023

(87) PCT Pub. No.: WO2022/064924

PCT Pub. Date: Mar. 31, 2022

(65) Prior Publication Data

US 2023/0340179 A1 Oct. 26, 2023

(30) Foreign Application Priority Data

Sep. 28, 2020 (JP) ................................. 2020-162094

(51) Int. Cl.
*C08G 2/24* (2006.01)

(52) U.S. Cl.
CPC ..................................... *C08G 2/24* (2013.01)

(58) Field of Classification Search
CPC ....................................................... C08G 2/24
See application file for complete search history.

(56) References Cited

U.S. PATENT DOCUMENTS

| | | | |
|---|---|---|---|
| 6,426,393 B1 | 7/2002 | Tajima et al. | |
| 2010/0087575 A1 | 4/2010 | Shimoda et al. | |
| 2016/0090445 A1* | 3/2016 | Hirano | C08G 2/06 528/408 |

FOREIGN PATENT DOCUMENTS

| | | |
|---|---|---|
| JP | 2000-038429 A | 2/2000 |
| JP | 2000-095829 A | 4/2000 |
| JP | 2000-095830 A | 4/2000 |
| JP | 2000-264940 A | 9/2000 |
| JP | 2002-234922 A | 8/2002 |
| JP | 2006-249445 A | 9/2006 |
| WO | 2008-078570 A1 | 7/2008 |

OTHER PUBLICATIONS

Office Action dated Oct. 1, 2024, issued in counterpart JP Application No. 2020-162094, with partial English translation.
Plastic—Determination of melt mass flow rate (MFR) and melt volume flow rate (MVR) of thermoplastics—Part 1: Standard test method, Japanese Industrial Standards, K7210-1:2014, Sep. 22, 2014, < URL: < https://kikakurui.com/k7/K7210-1-2014-01.htmlK>.,> with English translation. (72 pages).
Office Action dated Nov. 15, 2022, issued in counterpart JP application No. 2020-162094 with partial English translation. (7 pages).
Office Action dated Aug. 2, 2022, issued in counterpart JP application No. 2020-162094 with partial English translation. (8 pages).
International Search Report issued in counterpart International Application No. PCT/JP2021/030764, with English translation. (5 pages).

* cited by examiner

*Primary Examiner* — Shane Fang
(74) *Attorney, Agent, or Firm* — WHDA, LLP

(57) ABSTRACT

Provided is a method of manufacturing a polyacetal copolymer including: a step of copolymerizing 100 parts by mass of trioxane (A), 0.05 to 5 parts by mass of a cyclic acetal compound (B), and 0.001 to 1 parts by mass of an aliphatic glycidyl ether compound (C) having a chlorine content of 1 to 500 mass ppm, in the presence of a linear formal compound (D) as a molecular weight regulator, in which in the step, when a total mass (g) of the trioxane (A), the compound (B), and the compound (C) is "a", a molar number of the linear formal compound (D) is "b", and total molar numbers of water and methanol contained in the trioxane (A), the compound (B), and the compound (C) are respectively "c" and "d", setting is performed to satisfy (b+c+d)/a=1.5 to 7 μmol/g.

4 Claims, No Drawings

POLYACETAL COPOLYMER AND METHOD OF MANUFACTURING THE SAME

TECHNICAL FIELD

The present invention relates to a polyacetal copolymer and a method of manufacturing the same.

BACKGROUND ART

Polyacetal resins have excellent balance of mechanical properties, chemical resistance, slidability, and the like and processing thereof is easy, and therefore polyacetal resins are widely used as engineering plastics, mainly for electrical and electronic parts, automotive parts, and various other mechanical parts. However, as the range of their use has expanded in recent years, more advanced properties have become increasingly required. If polyacetal resins are used for thin parts, it is often necessary to have rigidity, creep resistance, and the like while maintaining the inherent fluidity, moldability, thermal stability, and slidability of polyacetal resins, for example.

However, it is extremely difficult to satisfy the above required properties in a balanced manner. If a method is adopted in which fillers such as fibers are blended into polyacetal resins to improve the rigidity, the appearance of the molded article becomes poor, sliding properties deteriorate, and the fluidity decreases, and the thermal stability may decrease depending on the fillers to be further blended, for example. In addition, in polyacetal copolymers, it is known that rigidity and the like are improved by reducing the amount of comonomers to be copolymerized. However, the improvement in rigidity by means of this method is not sufficient. Meanwhile, there is a decrease in the thermal stability of polymers due to the decrease in the amount of comonomers and there is a resulting adverse effect on the fluidity, moldability, and the like.

In view of the above circumstances, the present inventors have carried out studies focusing on enhancement of the rigidity, creep properties, and the like by modification of polymer backbones themselves of the polyacetal resins, and have proposed methods to enhance these properties (see Patent Literatures 1 to 3). According to these methods, it is possible to enhance the fluidity, creep resistance, and the like while maintaining the excellent and inherent fluidity, moldability, slidability, and the like of polyacetal resins.

CITATION LIST

Patent Literature

[Patent Literature 1] Japanese Unexamined Patent Application Publication No. 2000-38429

[Patent Literature 2] Japanese Unexamined Patent Application Publication No. 2000-95829

[Patent Literature 3] Japanese Unexamined Patent Application Publication No. 2000-95830

SUMMARY OF THE INVENTION

Problem to be Solved by the Invention

The polyacetal copolymer obtained by means of the above methods is basically good in terms of thermal stability. However, as a result of further studies thereafter, there were cases where, in manufacturing the copolymer, an operation became unstable in a polymerization process, a terminal stabilization process, or a melt-kneading process with a mixture such as a stabilizer, or the thermal stability of the resulting copolymer became inferior. The elucidation and remediation of the cause was an important issue for the practical application of the polyacetal copolymer by means of these methods.

The present invention has been devised in view of the above-described problems in the past, and an object of the present invention is to provide a polyacetal copolymer having excellent rigidity, creep resistance, and the like and also having thermal stability, and to provide a stable method of manufacturing the same.

Means for Solving the Problem

As a result of a diligent study to solve the above problems, the present inventors found that the chlorine content contained in an aliphatic glycidyl ether compound used for forming a branching and crosslinked structure at a polymer backbone of a polyacetal copolymer is a key factor for solving the problems, and found a suitable range for a melt flow rate (MFR) of the polyacetal copolymer and control means thereof, leading to the completion of the present invention.

One aspect of the present invention to solve the above problems is as follows.

(1) A method of manufacturing a polyacetal copolymer including: a step of copolymerizing 100 parts by mass of trioxane (A), 0.05 to 5 parts by mass of a cyclic acetal compound (B), and 0.001 to 1 parts by mass of an aliphatic glycidyl ether compound (C) having a chlorine content of 1 to 500 mass ppm, in the presence of a linear formal compound (D) as a molecular weight regulator, in which in the step, when a total mass (g) of the trioxane (A), the cyclic acetal compound (B), and the aliphatic glycidyl ether compound (C) is "a", a molar number of the linear formal compound (D) is "b", and total molar numbers of water and methanol contained in the trioxane (A), the cyclic acetal compound (B), and the aliphatic glycidyl ether compound (C) are respectively "c" and "d", setting is performed to satisfy $(b+c+d)/a=1.5$ to 7 μmol/g.

(2) The method of manufacturing a polyacetal copolymer according to (1), in which the linear formal compound (D) is one or more selected from the group consisting of methylal, ethylal, and dibutoxymethane.

(3) The method of manufacturing a polyacetal copolymer according to (1) or (2), in which the aliphatic glycidyl ether compound (C) is an aliphatic glycidyl ether compound having one glycidyloxy group in one molecule.

(4) The method of manufacturing a polyacetal copolymer according to (1) or (2), in which the aliphatic glycidyl ether compound (C) is one or more selected from n-butyl glycidyl ether and 2-ethylhexyl glycidyl ether.

(5) A polyacetal copolymer obtained by means of the method of manufacturing a polyacetal copolymer according to any one of (1) to (4).

Effect of the Invention

According to the present invention, it is possible to provide a polyacetal copolymer having excellent rigidity, creep resistance, and the like and also having thermal stability, and to provide a stable method of manufacturing the same.

MODES FOR CARRYING OUT THE INVENTION

<Method of Manufacturing Polyacetal Copolymer>

A method of manufacturing a polyacetal copolymer of the present embodiment includes a step of copolymerizing 100 parts by mass of trioxane (A), 0.05 to 5 parts by mass of a cyclic acetal compound (B), and 0.001 to 1 parts by mass of an aliphatic glycidyl ether compound (C) having a chlorine content of 1 to 500 mass ppm, in the presence of a linear formal compound (D) as a molecular weight regulator. In the step, when a total mass (g) of the trioxane (A), the cyclic acetal compound (B), and the aliphatic glycidyl ether compound (C) is "a", a molar number of the linear formal compound (D) is "b", and total molar numbers of water and methanol contained in the trioxane (A), the cyclic acetal compound (B), and the aliphatic glycidyl ether compound (C) are respectively "c" and "d", setting is performed to satisfy (b+c+d)/a=1.5 to 7 μmol/g.

First, each component used in the manufacturing method of the present embodiment will be described below.

[Trioxane (A)]

Trioxane (A) is a cyclic trimer of formaldehyde, which is obtained by generally reacting an aqueous solution of formaldehyde in the presence of an acidic catalyst, and is purified by means of methods such as distillation for use. The trioxane (A) used for polymerization preferably has as few impurities as possible, such as water and methanol.

[Cyclic Acetal Compound (B)]

A cyclic acetal compound (B) can be copolymerized with the trioxane (A). Examples of the compound include 1,3-dioxolane, propylene glycol formal, diethylene glycol formal, triethylene glycol formal, 1,4-butanediol formal, 1,5-pentanediol formal, and 1,6-hexanediol formal From thereamong, 1,3-dioxolane is preferred.

The copolymerization amount of the cyclic acetal compound (B) relative to 100 parts by mass of the trioxane (A) is 0.05 to 5 parts by mass, preferably 0.1 to 3 parts by mass, and more preferably 0.3 to 2.5 parts by mass. If the copolymerization ratio of the cyclic acetal compound (B) is less than 0.05 parts by mass, the polymerization reaction becomes unstable and the thermal stability of the polyacetal copolymer to be formed becomes inferior. Meanwhile, if the copolymerization ratio of the cyclic acetal compound (B) is more than 5 parts by mass, mechanical properties such as strength and rigidity deteriorate.

[Aliphatic Glycidyl Ether Compound (C)]

An aliphatic glycidyl ether compound (C) is a generic term for an aliphatic organic compound which has one or more glycidyloxy groups in a molecule. The aliphatic glycidyl ether compound (C) has a structure in which a branched or crosslinked structure may be formed at a polymer backbone by means of copolymerization with the trioxane. In this respect, the aliphatic glycidyl ether compound (C) is differentiated from the above-described cyclic acetal compound (B). As such an aliphatic glycidyl ether compound (C), either a monofunctional glycidyl ether compound having one glycidyloxy group or a polyfunctional glycidyl ether compound having two or more glycidyloxy groups can be used.

The compound is preferably a monofunctional glycidyl ether compound having one or more glycidyloxy groups.

Specific examples of the monofunctional glycidyl ether compound include methyl glycidyl ether, ethyl glycidyl ether, butyl glycidyl ether, 2-ethylhexyl glycidyl ether, and 2-methyloctyl glycidyl ether. Butyl glycidyl ether and 2-ethylhexyl glycidyl ether are preferably used.

Further, as the polyfunctional glycidyl compound having two or more glycidyloxy groups, the following are preferable compounds: a diglycidyl ether compound, a triglycidyl ether compound, and a tetraglycidyl ether compound. Specific examples of the polyfunctional glycidyl compound having two or more glycidyloxy groups include ethylene glycol diglycidyl ether, propylene glycol diglycidyl ether, 1,4-butanediol diglycidyl ether, hexamethylene glycol diglycidyl ether, trimethylolpropane triglycidyl ether, and pentaerythritol tetraglycidyl ether.

The copolymerization amount of the aliphatic glycidyl ether compound (C) relative to 100 parts by mass of the trioxane as component (A) is 0.001 to 1 parts by mass, preferably 0.01 to 1 parts by mass, and particularly preferably 0.1 to 1 parts by mass. If the copolymerization amount of component (C) is less than 0.001 parts by mass, it is not possible to obtain the effect of enhancing the rigidity and creep resistance. Meanwhile, if the copolymerization amount of component (C) is more than 1 part by mass, problems such as poor moldability due to a decrease in fluidity occur, and furthermore, mechanical properties such as the rigidity and creep resistance may decrease due to a decrease in the crystallinity of the resulting copolymer.

Further, in the present embodiment, it is particularly preferable to use one or more selected from n-butyl glycidyl ether and 2-ethylhexyl glycidyl ether as the aliphatic glycidyl ether compound (C) from the viewpoint of the rigidity and creep resistance.

The molecular weight of the aliphatic glycidyl ether compound (C) is preferably 100 to 220. If the molecular weight of the aliphatic glycidyl ether compound (C) is more than 220, a branched chain of the poly acetal copolymer formed by means of the copolymerization becomes longer, the crystallinity and the like of resins are disturbed, basic properties thereof are impaired, and an unfavorable effect may be caused on the rigidity and creep resistance. Meanwhile, if the molecular weight of component (C) is less than 100, the effect on the rigidity and creep resistance becomes extremely small.

In the present embodiment, as the aliphatic glycidyl ether compound (C), a compound with a chlorine content of 1 to 500 mass ppm is used. This makes it possible to stably manufacture a polyacetal copolymer that is especially excellent in terms of thermal stability. A compound with the chlorine content of 100 mass ppm or less is preferred. As for the lower limit of the chlorine content, it is preferable that the chlorine content be 1 mass ppm or more from the viewpoint of economic efficiency in manufacturing the aliphatic glycidyl ether compound (C) In addition, if the chlorine content of the aliphatic glycidyl ether compound (C) used is more than 500 mass ppm, the operations of a polymerization process, a terminal stabilization process, a commercialization process performed by blending a stabilizer, and the like become unstable, and the thermal stability of the obtained polyacetal copolymer becomes inferior.

The aliphatic glycidyl ether compound is generally manufactured by the reaction of an alcohol with epichlorohydrin. There is a conventionally known method in which epichlorohydrin is subjected to ring-opening addition to an alcohol in the presence of an acidic catalyst and then the alcohol is subjected to intramolecular ring-closing by using an alkaline aqueous solution to obtain a glycidyl ether compound (for example, Japanese Unexamined Patent Application Publication No. Sho 61-178974). How ever, it is known that the chlorine content in the glycidyl ether compound is high if this manufacturing method is used Meanwhile, a method is also disclosed in which when an alcohol is reacted with epichlorohydrin in the presence of a solid alkali metal compound to manufacture a glycidyl ether compound, the alcohol is reacted with epichlorohydrin in the presence of a milled solid alkali metal hydroxide in a reaction mixture. (for example, Japanese Unexamined Patent Application Publication No. Hei 1-151567). It is known that the chlorine content in the glycidyl ether compound is extremely low if this manufacturing method is used. In the present embodiment, a glycidyl ether compound with an extremely low chlorine content obtained by means this kind of method is used, for example.

In the present embodiment, the polyacetal copolymer is basically obtained by means of a method such as bulk polymerization of the trioxane (A), cyclic acetal compound (B), and aliphatic glycidyl ether compound (C) by using a cationic polymerization catalyst after the addition of an appropriate amount of a molecular weight regulator to the trioxane (A), cyclic acetal compound (B), and aliphatic glycidyl ether compound (C) as needed.

In the present embodiment, in order to obtain a polyacetal copolymer with excellent thermal stability, rigidity, impact resistance, and the like, it is preferable that constituent units derived from the cyclic acetal compound (B) and aliphatic glycidyl ether compound (C) be uniformly dispersed in the molecular chain of the polyacetal copolymer. For this purpose, when the poly acetal copolymer is manufactured by means of polymerization, it is effective to uniformly mix the cyclic acetal compound (B) and a catalyst, then add the mixture to a homogeneous mixed liquid of the aliphatic glycidyl ether compound (C) and trioxane (A), which has been separately and uniformly mixed in advance, and feed the mixture to a polymerizer for polymerization. By mixing the aliphatic glycidyl ether compound (C) and trioxane (A) in advance to form a homogeneous solution, a branching structure derived from the aliphatic glycidyl ether compound becomes well dispersed. This enhances not only mechanical properties but also the thermal stability.

In manufacturing the polyacetal copolymer of the present embodiment formed of the above-described constituent components, there are no particular limitations on the polymerization apparatus and a known apparatus is used, and the polyacetal copolymer may be manufactured by means of any method such as a batch or continuous method. Further, the polymerization temperature is preferably kept at 65 to 135° C.

Deactivation after polymerization is performed by adding a basic compound or an aqueous solution of a basic compound to the reaction product discharged from the polymerizer or the reaction product in the polymerizer after the polymerization reaction.

Examples of the cationic polymerization catalyst used in the present embodiment include lead tetrachloride; tin tetrachloride; titanium tetrachloride; aluminum trichloride; zinc chloride: vanadium trichloride; antimony trichloride; phosphorus pentafluoride; antimony pentafluoride; boron trifluoride; boron trifluoride coordinated compounds such as boron trifluoride diethyl etherate, boron trifluoride dibutyl etherate, boron trifluoride dioxanate, boron trifluoride acetic anhydrate, and boron trifluoride triethylamine complex compounds; inorganic and organic acids such as perchloric acid, acetyl perchlorate, t-butyl perchlorate, hydroxyacetic acid, trichloroacetic acid, trifluoroacetic acid, and p-toluenesulfonic acid; complex salt compounds such as triethyloxonium tetrafluoroborate, triphenylmethyl hexafluoroantimonate, aryl diazonium hexafluorophosphate, and aryl diazonium tetrafluoroborate; alkyl metal salts such as diethyl zinc, triethylaluminum, and diethylaluminum chloride; heteropolyacids; and isopolyacids.

From thereamong, the following are particularly preferable; boron trifluoride, boron trifluoride coordinated compounds such as boron trifluoride diethyl etherate, boron trifluoride dibutyl etherate, boron trifluoride dioxanate, boron trifluoride acetic anhydrate, and boron trifluoride triethylamine complex compounds. These catalysts can also be used by pre-dilution with organic solvents or the like.

A linear formal compound is used as the molecular weight regulator used in the present embodiment. Examples of the linear formal compound include methylal, ethylal, dibutoxymethane, bis(methoxymethyl) ether, bis(ethoxymethyl) ether, and bis(butoxymethyl) ether. Among these, the compound is preferably one or more selected from the group consisting of methylal, ethylal, and dibutoxymethane.

As a basic compound for neutralizing and deactivating a polymerization catalyst, the following are used: ammonia or amines such as triethylamine, tributylamine, triethanolamine, and tributanolamine, or hydroxides and salts of alkali metal and alkaline earth metal, or other known catalyst deactivators. Further, it is preferable that, after the polymerization reaction, these aqueous solutions be quickly added to the product for the deactivation. After performing such polymerization and deactivation methods, further washing, separation and recovery of unreacted monomers, drying, and the like are performed by means of conventional known methods as needed.

Further, a stabilization treatment such as decomposition and removal of unstable ends or sealing of unstable ends by using a stable substance is performed by means of known methods as needed, and various necessary stabilizers are blended. The stabilizers used herein are one or more of a hindered phenolic compound, a nitrogen-containing compound, a hydroxide, inorganic salt, and carboxylate of an alkali or alkaline earth metal. Furthermore, as long as the effect of the polyacetal copolymer of the present embodiment is not inhibited, one or more of the following can be added to a polyacetal resin as common additives when needed, a coloring agent such as a dye or a pigment, a lubricant, a nucleating agent, a mold release agent, an antistatic agent, a surfactant, an organic polymer material, or an inorganic or organic fibrous, powdery, or plate-like filler.

In the present embodiment, in the process of performing the copolymerization, when the total mass (g) of the trioxane (A), cyclic acetal compound (B), and aliphatic glycidyl ether compound (C) is "a", the molar number of the linear formal compound (D) is "b", and the total molar numbers of water and methanol contained in the components (A), (B), and (C) are 'c' and "d" respectively, setting is performed such that the following is satisfied: $(b+c+d)/a=1.5$ to 7 μmol/g. When $(b+c+d)/a=1.5$ to 7 μmol/g is satisfied, it is possible to set a melt flow rate (MFR) measured according to ISO 1133 to be 0.5 to 3 g/10 min. If the MFR is 0.5 to 3 g/10 min. creep resistance can be enhanced while maintaining moldability. The MFR is particularly preferably 1 to 2.5 g/10 min.

Both of the water and methanol contained in the components (A), (B) and (C) above are derived from impurities.

<Polyacetal Copolymer>

The polyacetal copolymer of the present embodiment is obtained by means of the method of manufacturing the polyacetal copolymer of the present embodiment described above. Therefore, the polyacetal copolymer of the present embodiment has excellent rigidity, creep resistance, and the like, and also has thermal stability.

EXAMPLES

Although the present embodiment will be described more specifically by using the following examples, the present embodiment is not limited to the following examples.

Examples 1 to 9

A continuous mixing reactor was used. The continuous mixing reactor included rotary shafts with paddles, and a barrel. The barrel had on the outside a jacket allowing a heating (cooling) medium to pass therethrough, and the barrel had a cross section with the shape of two partially overlapping circles. The trioxane (A), cyclic acetal compound (B), and aliphatic glycidyl ether compound (C) were added in the proportions and amounts shown in Table 1, while rotating both of the two rotary shafts with paddles at 150 rpm. Further, the linear formal compound (D) shown in Table 1 was continuously supplied as the molecular weight regulator in the proportion and amount shown in Table 1. A boron trifluoride gas constituting the catalyst was mixed with the trioxane to achieve 0.005 mass % in terms of a boron trifluoride equivalent to obtain a homogeneous mixture, and the homogeneous mixture was continuously added and supplied to perform bulk polymerization. The reaction product discharged from the polymerizer was quickly passed through a crusher, and an aqueous solution containing 0.1 mass % of triethylamime at 80° C. was added thereto to deactivate the catalyst. Furthermore, after separation, washing, and drying, a crude polyacetal copolymer was obtained.

Then, to 100 parts by mass of the crude polyacetal copolymer, 4 parts by mass of a 5 mass % of triethylamine aqueous solution, and 0.03 parts by mass of pentaerythrityl-tetrakis [3-(3,5-di-tert-butyl-4-hydroxyphenyl)propionate] were added, the mixture was melt-kneaded by using a twin-screw extruder at 210° C., and unstable parts were removed.

To 100 parts by mass of the branched or crosslinked poly acetal copolymer obtained by means of the above method, 0.3 parts by mass of pentaerythrityl-tetrakis [3-(3,5-di-tert-butyl-4-hydroxyphenyl)propionate] and 0.15 parts by mass of melamine were further added as the stabilizer, the mixture was melt-kneaded by using a twin-screw extruder at 210° C. and accordingly a pellet-like branched polyacetal copolymer was obtained. Table 2 shows evaluation results obtained by means of a method described later.

Comparative Examples 1 to 5

As shown in Table 1, with respect to a case where the chlorine content of the aliphatic glycidyl ether compound (C) is outside the scope of the present embodiment and a case where the MFR of the branched polyacetal copolymer is outside the scope of the present embodiment. Table 2 shows the evaluation results of the pellet-like polyacetal copolymer obtained in the same manner as in the examples.

The abbreviations of each component shown in Table 1 indicate the following meanings

[Cyclic Acetal Compound]

DO: 1,3-dioxolane

[Aliphatic Glycidyl Ether Compound]

BGE; Butyl glycidyl ether

2EHGE: 2-ethylhexyl glycidyl ether

BDGE; Butanediol diglycidyl ether

For each aliphatic glycidyl ether compound, by performing different synthetic methods, a plurality of compounds with different chlorine contents were obtained.

[Chlorine Content]

The measurement of the chlorine content of the aliphatic glycidyl ether compound was performed by means of following methods.

50 mg of a measurement sample (the amount of the measurement sample is 5 mg if the chlorine content is more than 1000 ppm) was combusted and decomposed by using a sample combustion unit (AFQ-100 manufactured by Mitsubishi chemical Analytech Co., Ltd.) while introducing steam, and the generated gas was absorbed into an absorbing liquid using phosphate ions as an internal standard. This absorbing liquid sample was measured by using an anion chromatograph (ICS-1600 manufactured by Dionex Corporation), the amount of chlorine ions was determined, and the chlorine content of the measurement sample was determined.

[Total Water Content in Component (A), Component (B), and Component (C)]

The water content of the mixed liquid of the component (A), component (B), and component (C) was measured by means of the Karl Fischer method.

[Total Methanol Amount in Component (A), Component (B), and Component (C)]

The measurement was performed using the mixed liquid of the component (A), component (B), and component (C) by means of the gas chromatography method.

[MFR]

The melt flow rate (MFR) of the polyacetal copolymer was measured according to ISO 1133.

<Evaluation>

The flexural modulus, creep resistance, and formaldehyde generation of the pellet-like polyacetal copolymer according to the examples and comparative examples were evaluated as follows.

[Rigidity (Flexural Modulus)]

The flexural modulus (FM) according to ISO 178 was measured. The conditions of a measuring chamber were 23° C. and 55% RH.

[Creep Resistance (Creep Rupture Time)]

An ISO Type-A test piece with a thickness of 4 mm was molded, a load of 21 MPa was applied under an 80° C. environment to perform a creep test using a creep testing machine, and the time to rupture (creep rupture time (h)) was compared. Three test pieces were measured, and the average was taken as the creep rupture time.

[Thermal Stability (Formaldehyde Generation from Melt)]

A 5-g pellet was accurately weighed and held in a metal container at 200° C. for 5 minutes, and thereafter the atmosphere inside the container was absorbed into distilled water. The amount of formaldehyde of this aqueous solution was determined according to JISK 0102,29. (the section on formaldehyde) and the amount of formaldehyde gas (ppm) generated from the pellet was calculated.

TABLE 1

| | | Synthesis of polyacetal copolymer | | | | | | | | |
|---|---|---|---|---|---|---|---|---|---|---|
| | | Component (A) | | Component (B) Cyclic acetal | | | Component (C) Aliphatic glycidyl ether compound | | | |
| | | Trioxane | | | Parts | | | Chlorine | Parts | |
| | | Parts by mass | kg/hr | Type | by mass | g/hr | Type | content (ppm) | by mass | g/hr |
| Example | 1 | 100 | 10 | DO | 1.7 | 170 | BGE | 90 | 0.3 | 40 |
| | 2 | 100 | 10 | DO | 1.7 | 170 | EGE | 30 | 0.3 | 40 |
| | 3 | 100 | 10 | DO | 1.7 | 170 | BGE | 90 | 0.3 | 40 |
| | 4 | 100 | 10 | DO | 1.7 | 170 | BGE | 90 | 0.3 | 10 |
| | 5 | 100 | 10 | DO | 1.7 | 170 | BGE | 40 | 0.3 | 40 |
| | 6 | 100 | 10 | DO | 1.7 | 170 | BGE | 90 | 0.3 | 40 |
| | 7 | 100 | 10 | DO | 1.7 | 170 | BGE | 320 | 0.3 | 20 |
| | 8 | 100 | 10 | DO | 1.7 | 170 | 2EHGE | 100 | 0.4 | 60 |
| | 9 | 100 | 10 | DO | 3.0 | 300 | BDGE | 300 | 0.3 | 10 |
| Comparative | 1 | 100 | 10 | DO | 1.7 | 170 | BGE | 800 | 0.3 | 30 |
| example | 2 | 100 | 10 | DO | 1.7 | 170 | BGE | 100 | 0.3 | 30 |
| | 3 | 100 | 10 | DO | 1.7 | 170 | 2EHGE | 600 | 0.4 | 40 |
| | 4 | 100 | 10 | DO | 3.0 | 300 | BDGE | 1000 | 0.1 | 10 |
| | 5 | 100 | 10 | DO | 3.0 | 300 | BDGE | 300 | 0.1 | 10 |

| | | Synthesis of polyacetal copolymer | | | | | | | | |
|---|---|---|---|---|---|---|---|---|---|---|
| | | Total mass of components (A), (B), and (C) a | Component (D) | | | Total water content in components (A), (B), and (C) | | Total methanol amount in components (A), (B), and (C) | | Formula (b + c + d)/a |
| | | | Linear formal | | b mol/ | Water | c mol/ | Methanol | d mol/ | µmol/ |
| | | g/hr | Type | g/hr | hr | g/hr | hr | g/hr | hr | g |
| Example | 1 | 10210 | Methylal | 0.5 | 0.0079 | 0.10 | 0.0056 | 0.10 | 0.0031 | 1.6 |
| | 2 | 10210 | Methylal | 2.0 | 0.0263 | 0.10 | 0.0056 | 0.10 | 0.0031 | 3.4 |
| | 3 | 10210 | Methylal | 2.8 | 0.0368 | 0.11 | 0.0061 | 0.10 | 0.0031 | 4.5 |
| | 4 | 10210 | Methylal | 4.2 | 0.0552 | 0.12 | 0.0057 | 0.10 | 0.0031 | 6.4 |
| | 5 | 10210 | Methylal | 1.2 | 0.0158 | 0.10 | 0.0056 | 0.10 | 0.0031 | 2.4 |
| | 6 | 10210 | Methylal | 4.3 | 0.0565 | 0.18 | 0.0100 | 0.10 | 0.0031 | 6.8 |
| | 7 | 10190 | Methylal | 0.8 | 0.0105 | 0.12 | 0.0067 | 0.10 | 0.0031 | 2.0 |
| | 8 | 10230 | Ethylal | 3.3 | 0.0315 | 0.11 | 0.0061 | 0.10 | 0.0031 | 4.0 |
| | 9 | 10310 | Dibutoxymethane | 3.2 | 0.0197 | 0.13 | 0.0072 | 0.10 | 0.0031 | 2.9 |
| Comparative | 1 | 10200 | Methylal | 0.9 | 0.0118 | 0.10 | 0.0056 | 0.13 | 0.0040 | 2.1 |
| example | 2 | 10200 | Methylal | 6.0 | 0.0789 | 0.10 | 0.0056 | 0.30 | 0.0031 | 8.6 |
| | 3 | 10210 | Ethylal | 7.7 | 0.0735 | 0.10 | 0.0056 | 0.10 | 0.0031 | 8.1 |
| | 4 | 10310 | Dibutoxymethane | 2.5 | 0.0157 | 0.10 | 0.0056 | 0.10 | 0.0031 | 2.4 |
| | 5 | 10310 | Dibutoxymethane | 12.6 | 0.0786 | 0.10 | 0.0056 | 0.10 | 0.0031 | 8.5 |

TABLE 2

| | | Evaluation result | | | |
|---|---|---|---|---|---|
| | | MFR g/10 min | Rigidity Flexural modulus MPa | Creep resistance Creep rupture time hr | Thermal stability Formaldehyde generation ppm |
| Example | 1 | 0.6 | 2450 | 1590 | 50 |
| | 2 | 1.4 | 2520 | 930 | 80 |
| | 3 | 2.0 | 2490 | 970 | 60 |
| | 4 | 2.9 | 2370 | 560 | 70 |
| | 5 | 0.9 | 2520 | 1250 | 40 |
| | 6 | 3.0 | 2410 | 550 | 70 |
| | 7 | 0.7 | 2430 | 1460 | 140 |
| | 8 | 1.8 | 2390 | 830 | 80 |
| | 9 | 1.2 | 2610 | 920 | 130 |
| Comparative | 1 | 0.8 | 2400 | 1230 | 500 |
| Example | 2 | 4.5 | 2380 | 350 | 60 |
| | 3 | 4.0 | 2580 | 400 | 900 |

TABLE 2-continued

| | | Evaluation result | | | |
|---|---|---|---|---|---|
| | | MFR g/10 min | Rigidity Flexural modulus MPa | Creep resistance Creep rupture time hr | Thermal stability Formaldehyde generation ppm |
| | 4 | 1.0 | 2540 | 1050 | 1700 |
| | 5 | 4.5 | 2590 | 330 | 140 |

Table 2 reveals that, in Examples 1 to 9, it is possible to provide a polyacetal copolymer having sufficient rigidity (flexural modulus of 2350 MPa or more), excellent creep resistance (rupture time of 500 h or longer), and thermal stability (low formaldehyde generation (150 ppm or less)). Meanwhile, in Comparative Examples 1 to 5, although the rigidity was sufficient, at least one out of the creep resistance and thermal stability was inferior. In particular, although Examples 1 to 7, Comparative Examples 1 and 2, Example 8. Comparative Example 3. Example 9, and Comparative Example 4 each have different chlorine contents of the aliphatic glycidyl ether compounds, the comparison thereof shows that the thermal stability is inferior if the chlorine content is not within the prescribed range.

In addition, it can be seen from the examples and comparative examples in Table 1 that the MFR of the polyacetal copolymer can be set to 0.5 to 3 g/10 min if the specific component ratio satisfies (b+c+d)/a=1.5 to 7 μmol/g.

What is claimed is:

1. A method of manufacturing a polyacetal copolymer comprising:

a step of copolymerizing 100 parts by mass of trioxane (A), 0.05 to 5 parts by mass of a cyclic acetal compound (B), and 0.001 to 1 parts by mass of an aliphatic glycidyl ether compound (C) having a chlorine content of 1 to 500 mass ppm, in the presence of a linear formal compound (D) as a molecular weight regulator, wherein in the step, when a total mass (g) of the trioxane (A), the cyclic acetal compound (B), and the aliphatic glycidyl ether compound (C) is "a", a molar number of the linear formal compound (D) is "b", and total molar numbers of water and methanol contained in the trioxane (A), the cyclic acetal compound (B), and the aliphatic glycidyl ether compound (C) are respectively "c" and "d", setting is performed to satisfy (b+c+d)/a=1.5 to 7 μmol/g, wherein a melt flow rate (MFR) of the polyacetal copolymer measured according to ISO 1133 is 0.5 to 3 g/10 min.

2. The method of manufacturing a polyacetal copolymer according to claim 1, wherein the linear formal compound (D) is one or more selected from the group consisting of methylal, ethylal, and dibutoxymethane.

3. The method of manufacturing a polyacetal copolymer according to claim 1, wherein the aliphatic glycidyl ether compound (C) is an aliphatic glycidyl ether compound having one glycidyloxy group in one molecule.

4. The method of manufacturing a polyacetal copolymer according to claim 1, wherein the aliphatic glycidyl ether compound (C) is one or more selected from n-butyl glycidyl ether and 2-ethylhexyl glycidyl ether.

* * * * *